United States Patent
Sato

(10) Patent No.: US 12,457,410 B2
(45) Date of Patent: Oct. 28, 2025

(54) IMAGE PICK UP APPARATUS, AND LENS APPARATUS

(71) Applicant: CANON KABUSHIKI KAISHA, Tokyo (JP)

(72) Inventor: Takehiko Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 18/322,754

(22) Filed: May 24, 2023

(65) Prior Publication Data

US 2023/0396870 A1    Dec. 7, 2023

(30) Foreign Application Priority Data

Jun. 6, 2022 (JP) ................. 2022-091385

(51) Int. Cl.
*H04N 23/62* (2023.01)
*G06F 3/0346* (2013.01)
*H04N 23/55* (2023.01)

(52) U.S. Cl.
CPC ........... *H04N 23/62* (2023.01); *G06F 3/0346* (2013.01); *H04N 23/55* (2023.01)

(58) Field of Classification Search
CPC ....... H04N 23/62; H04N 23/55; G06F 3/0346

USPC ...................................... 348/211.6
See application file for complete search history.

(56) References Cited

U.S. PATENT DOCUMENTS

| 7,831,143 B2 | 11/2010 | Okazaki |
| 2017/0126960 A1* | 5/2017 | Kinoshita .............. H04N 23/62 |

FOREIGN PATENT DOCUMENTS

| JP | 2002040540 A | 2/2002 |
| JP | 2008242212 A | 10/2008 |
| JP | 2010135988 A | 6/2010 |
| JP | 2010226525 A | 10/2010 |

* cited by examiner

*Primary Examiner* — Joel W Fosselman
(74) *Attorney, Agent, or Firm* — ROSSI, KIMMS & McDOWELL LLP

(57) ABSTRACT

A camera comprises a camera body for capturing an image formed by a lens apparatus including lenses, and an attitude sensor. A plurality of buttons (a first button and a second button) is arranged on an exterior portion of the lens apparatus, each of the plurality of buttons is assigned a function to be executed by operating the first button and the second button, respectively, and the assigned function is switched in accordance with the attitude of the camera detected by the attitude sensor.

10 Claims, 6 Drawing Sheets

IMAGE PICK UP APPARATUS, AND LENS APPARATUS

BACKGROUND OF THE INVENTION

Field of the Invention

The present disclosure relates to an image pick up apparatus and a lens apparatus.

Description of the Related Art

There is known a technique for detecting an attitude of a camera and changing a function of the camera based on the detection result. Japanese Patent Application Laid-Open No. 2010-226525 discloses a technique of assigning the function of a release switch to one of a plurality of operation switches arranged on a rear surface of the camera when it is determined that the camera is in a longitudinal attitude.

The technique disclosed in Japanese Patent Application Laid-Open No. 2010-226525 is intended for the camera having a small and lightweight lens. However, for the camera having a large and heavy lens, the position of the hand holding a camera body or a lens barrel changes in accordance with the attitude of the camera, and thus the operability of the buttons by the photographer may be impaired depending on the attitude of the camera.

SUMMARY OF THE INVENTION

An aspect of the present disclosure provides, an image pick up apparatus advantageous in an operability for a photographer even when the attitude of the image pick up apparatus is changed.

According to an embodiment of the present disclosure, an image pick up apparatus comprising: an image pickup portion configured to capture an image formed by a lens apparatus including lenses; and an attitude sensor, wherein a plurality of buttons is arranged on an exterior portion of the lens apparatus; each of the plurality of buttons is assigned a function to be executed by operating the buttons; and the assigned function is switched in accordance with the attitude of the image pick up apparatus detected by the attitude sensor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
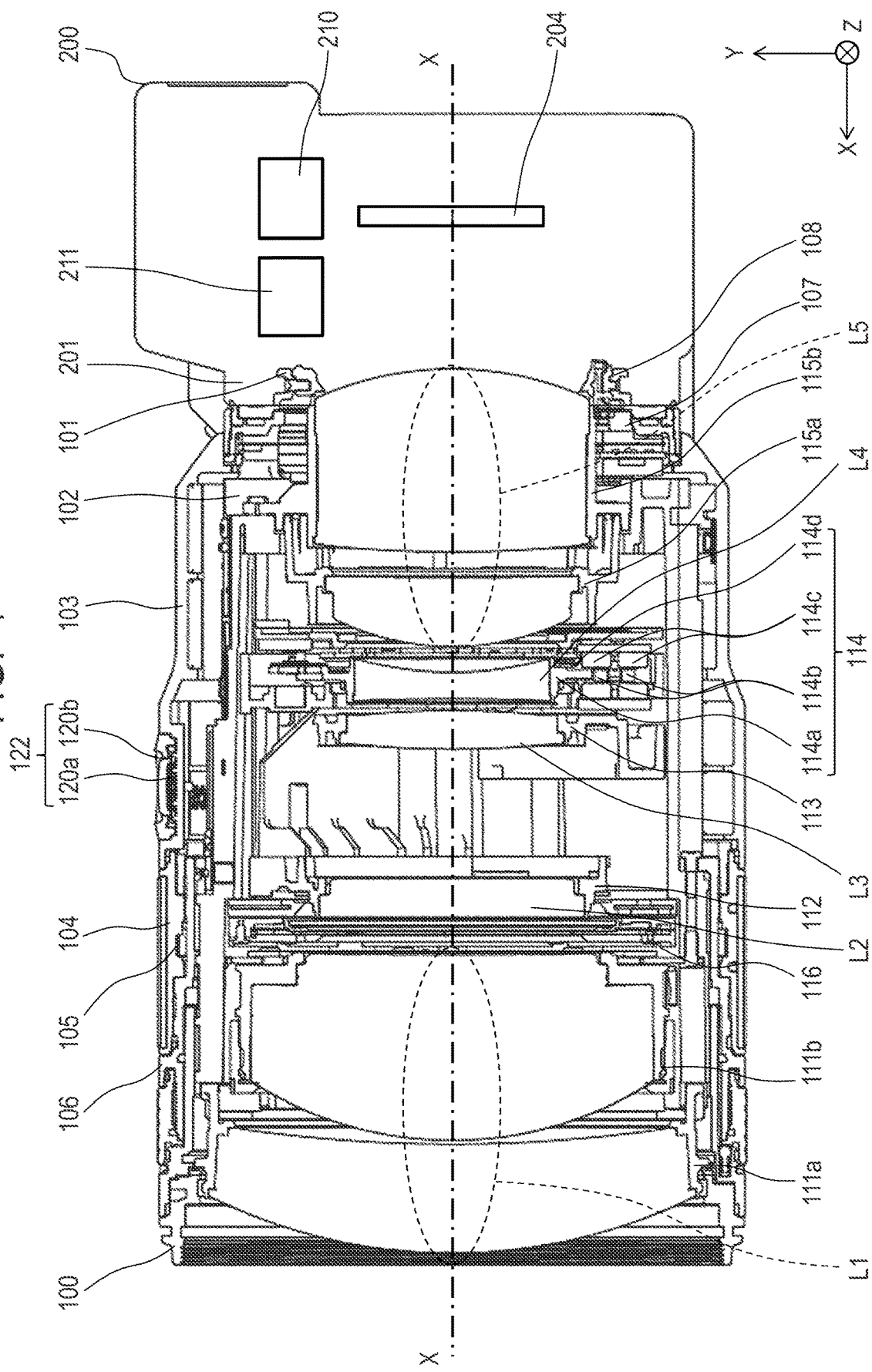
FIG. 1 is a cross-sectional view of the camera configured by mounting the lens apparatus (100) according to an embodiment to the camera body (200).

A dot and dash line in FIG. 1 indicates an optical axis X. In addition, a direction from the camera body 200 (image pickup portion) to a subject along the optical axis X with an intersection point between an image pick up element 204 to be described later and the optical axis X as an origin is set as a +X direction.

Figure 2:
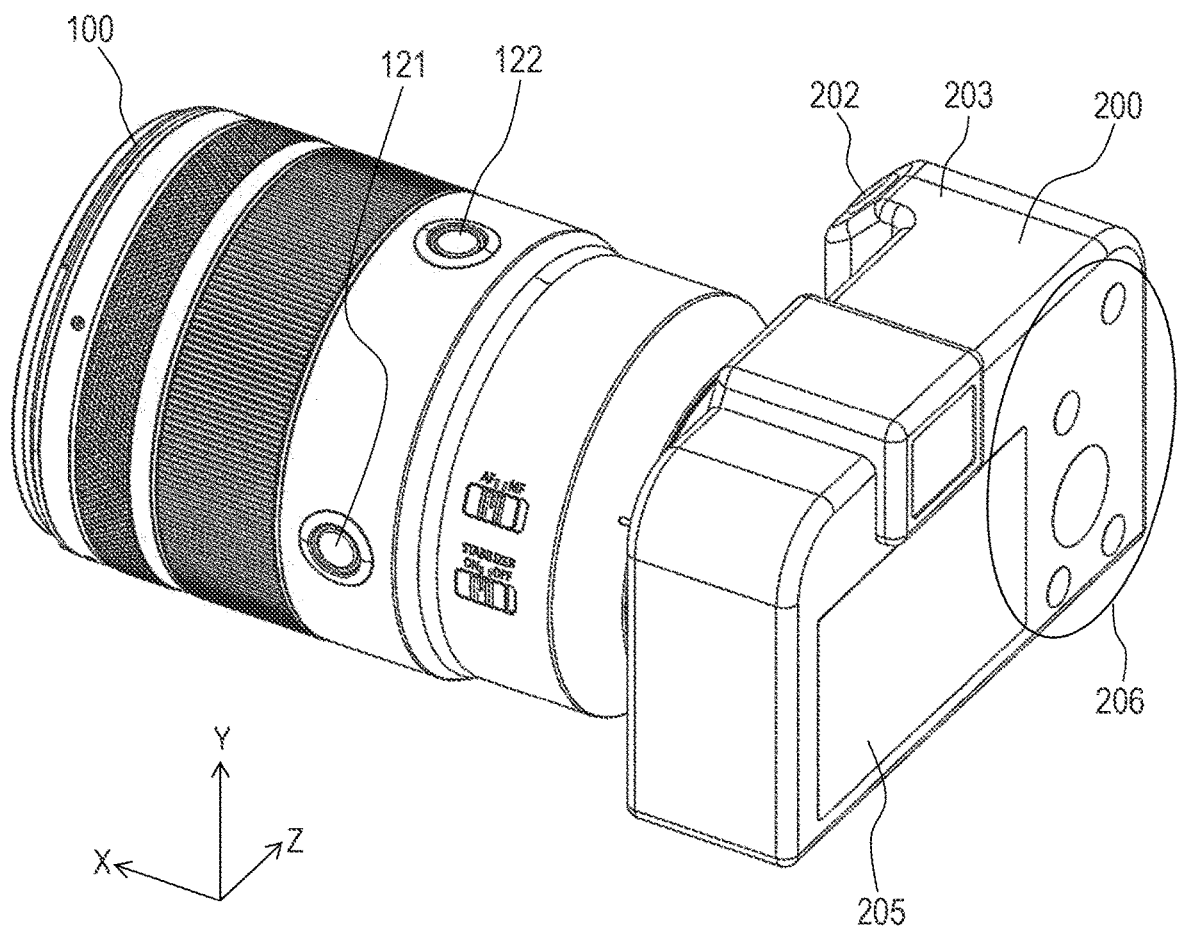
FIG. 2 is a perspective view of the camera configured by mounting the lens apparatus (100) according to the embodiment to the camera body (200).

FIG. 1 is a cross-sectional view of a camera (image pick up apparatus) configured by mounting a lens apparatus 100 (optical portion) according to an embodiment of the present disclosure to a camera body 200. FIG. 2 is a perspective view of the camera configured by mounting the lens apparatus 100 according to the embodiment of the present disclosure to the camera body 200. Hereinafter, the embodiment will be described by taking, as an example, a so-called interchangeable lens for a single-lens reflex camera in which the lens apparatus 100 is detachably mounted on the camera body 200. Note that the present disclosure is also applicable to a so-called lens-integrated camera in which the lens apparatus 100 including a lens and the camera body 200 that captures an image formed by the lens apparatus 100 are integrally configured.

A base barrel 102 is integrally fixed to a mount 101 together with a rear fixed barrel 103. A contact block 108 is electrically connected to a control board 107, and the contact block 108 has functions of communicating with the camera body 200 and receiving supply of electric power. The electromagnetic diaphragm unit 116 is held by the base barrel 102 and is electrically connected to the control board 107.

In a first lens unit L1 configured by a plurality of lenses, each lens is held by a 1A lens barrel 111a and a 1B lens barrel 111b, and both the 1A lens barrel 111a and the 1B lens barrel 111b are fixed to the base barrel 102.

A second lens unit L2 is a lens for focus adjustment, and is held by a second lens barrel 112. The second lens barrel 112 is held by the base barrel 102 so as to be movable in the optical axis direction by a guide bar (not illustrated). The second lens barrel 112 is driven in the optical axis direction by a linear ultrasonic motor (not illustrated) held by the base barrel 102.

The linear ultrasonic motor includes a fixed portion and a movable portion, and drives the movable portion in the optical axis direction by ultrasonically vibrating a piezoelectric element, and is based on a well-known technique. The piezoelectric element is electrically connected to the control board 107 by a flexible printed board (not illustrated).

A third lens unit L3 is held by a third lens barrel 113 and is fixed to the base barrel 102. A fourth lens unit L4 is held by a fourth lens barrel 114a in a shift unit 114.

And drive coils 114b are held in the fourth lens barrel 114a. A shift base 114d in the shift unit 114 holds drive magnets 114c at positions opposed to the drive coil 114b in the optical axis direction. The drive coils 114b and the drive magnets 114c serve as shift drive actuators. And the fourth lens barrel 114a is held movably within a plane perpendicular to the optical axis X with respect to the shift base 114d. By energizing the drive coils 114b from the control board 107 via the flexible printed board (not illustrated), a Lorentz force is generated between the control board 107 and the drive magnet 114c to drive the fourth lens barrel 114a. And the shift unit 114 includes a sensor (not illustrated) that detects a driving amount of the fourth lens barrel 114a. Based on signal information from this sensor and a shake signal detected by a shake sensor (not illustrated) attached to the rear fixed barrel 103, the control board 107 drives and controls the fourth lens barrel 114a to correct a shake. This is an example of a method generally called optical shake correction.

A fifth lens unit L5 configured by a plurality of lenses are respectively held by a 5A lens barrel 115a and the a 5B lens barrel 115b, and both the 5A lens barrel 115a and the 5B lens barrel 115b are fixed to the base barrel 102.

A focus operation ring 104 is restricted from moving in the optical axis direction by a front fixed barrel 106 and a rear fixed barrel 103 fixed to the base barrel 102, and is held by the front fixed barrel 106 so as to be rotatable only around the optical axis X. A focus operation ring scale 105 is bonded and fixed to the inner periphery of the focus operation ring 104. The focus operation ring scale 105 is a component on which a continuous pattern is formed in the circumferential direction of the focus operation ring 104. By reading this pattern with a position sensor (not illustrated) attached to the front fixed barrel 106 fixed to the base barrel 102, the rotation amount of the focus operation ring 104 can be detected. The linear ultrasonic motor for focus adjustment is driven in accordance with the detected rotation amount of the focus operation ring 104.

The second lens unit L2 for focus adjustment is driven in the optical axis direction by the linear ultrasonic motor. A second lens barrel scale (not illustrated) is bonded and fixed to the second lens barrel 112. The second lens barrel scale is a component on which a continuous pattern is formed in the optical axis direction. By reading this pattern with a position sensor (not illustrated) attached to the base barrel 102 side, the relative position of the second lens barrel 112 with respect to the base barrel 102 in the optical axis direction can be detected.

The mount 101 of the lens apparatus 100 is held by a bayonet coupling to a camera mount 201 provided on the camera body 200. A camera grip 203 of the camera body 200 is provided with a shutter button 202.

The image pick up element 204 is arranged inside the camera body 200. When the shutter button 202 is operated, light rays that have passed through the first lens unit L1, the second lens unit L2, the third lens unit L3, the fourth lens unit L4, and the fifth lens unit L5 are processed by a camera control circuit 210 so as to record an image formed on the image pick up element 204. An image sensor such as a CCD or a CMOS is used as the image pick up element 204. The camera body 200 includes an attitude sensor 211, and the attitude sensor 211 can detect attitudes of the camera body 200.

A first button 121 and a second button 122 (a plurality of buttons) are arranged on an exterior portion (outer peripheral surface) of the lens apparatus 100. The flexible printed board 120b having a tact SW120a is arranged inside the first button 121 and the second button 122. The flexible printed board 120b is connected to the control board 107. When the first button 121 and the second button 122 are operated to be pressed in a direction from the outside of the lens apparatus 100 to the inside of the lens apparatus 100, the tact SW120a is pressed down. Then, a signal is sent to the camera control circuit 210 on the camera body 200 side via the control board 107 and the contact block 108. On the camera body 200 side, various functions related to photographing are processed by receiving the signal.

An operability of the first button 121 and the second button 122 provided on the exterior portion of the lens apparatus 100 changes according to the attitude of the camera. In general, the photographer holds the camera grip 203 of the camera body 200 with the right hand. The left hand holds the lens apparatus 100 and the camera body 200 so as to support them from below. In addition, the photographer rotates operation rings such as a zoom ring or the focus operation ring 104 provided on the exterior portion of the lens apparatus 100 around the optical axis X with a thumb, an index finger, or the like of the left hand to perform zoom or focus adjustment. The photographer also operates other buttons provided on the exterior portion of the lens apparatus 100 with the fingers of the left hand.

By operating the first button 121 and the second button 122, contents of processing performed by the camera control circuit 210 can be registered in the camera control circuit 210 by operating a camera operation portion 206 and a touch panel monitor 205. As the monitor 205, a liquid crystal panel, an organic EL panel, or the like, which generally has a touch panel function, is used.

Here, when the camera is placed horizontally, a direction from the monitor 205 of the camera body 200 toward the camera operation portion 206 is defined as a +Z direction, and a direction from the optical axis X toward the second button 122 is defined as a +Y direction. As for the attitude of the camera, a state in which the camera grip 203 is in a horizontal direction is referred to as a normal attitude (hereinafter referred to as a lateral attitude or a first attitude). A state in which the camera grip 203 is in a vertical upper direction (see FIG. 3B) is referred to as a first longitudinal attitude (second attitude), and a state in which the camera grip 110 is in a vertical lower direction (see FIG. 4B) is referred to as a second longitudinal attitude (second attitude).

The first button 121 is arranged at a position in the −Z direction when viewed in the optical axis direction from the camera mount 201 side, and the second button 122 is similarly arranged at a position in the +Y direction. The first button 121 and the second button 122 are arranged on the exterior portion of the lens apparatus 100 at an angle of approximately 90 degrees around the optical axis X, but the angle is not limited to 90 degrees and may be an arbitrary angle.

The photographer can select and assign (set) an individual arbitrary function corresponding to the attitude of the camera to each of the first button 121 and the second button 122 from a plurality of functions relating to image capturing prepared in advance. Examples of functions that can be assigned include a function of interrupting an operation (servo AF) of automatically continuing to focus on a subject, and a function of switching between a left eye and a right eye in an operation (pupil AF) of automatically focusing on the pupil of a person as a subject. In addition, there are various functions relating to photographing, such as a shutter function and a function (powered IS) of emphasis control processing of low-frequency blur suppression in camera shake correction control. The individual functions assigned to the first button 121 and the second button 122 can be displayed on the monitor 205, and the photographer can confirm the latest functions of the first button 121 and the second button 122 on the monitor 205.

The assigned function can be executed by the camera control circuit 210 by operating at least one of the first button 121 and the second button 122. In this embodiment, these assigned functions can be set to be switched according to the attitude of the camera detected by the attitude sensor 211. According to the embodiments, it is possible to provide an image pick up apparatus that is advantageous in terms of operability for a photographer even when the attitude of the camera changes. In the present specification "Assign" means that the photographer initially sets a function, and "switch" means that the assigned function is changed by detection of the attitude sensor 211.

Although the attitude of the camera is detected by the attitude sensor 211 provided in the camera body 200, the attitude sensor 211 may be provided in at least one of the camera body 200 and the lens apparatus 100, or may be provided in both of them to detect the attitude of the camera. The attitude sensor 211 detects a first attitude of the camera and a second attitude (a first longitudinal attitude and a second longitudinal attitude) in which the camera is positioned at a different angle around the optical axis X from the first attitude.

The functions are assigned to the first button 121 and the second button 122 using the camera operation portion 206 or the like provided in the camera body 200, but such an operation portion may be provided in the lens apparatus 100 to perform an assignment operation. That is, a function is assigned to each of the first button 121 and the second button 122 by the photographer through the operation portion of at least one of the camera body 200 and the lens apparatus 100. Alternatively, such an operation portion may be provided in both the camera body 200 and the lens apparatus 100.

Further, a priority order of functions prepared in advance can be set, and the functions assigned to the first button 121 and the second button 122 may be switched in accordance with the priority order and the attitude of the camera detected by the attitude sensor 211.

In the above description, these assigned functions are switched in accordance with the attitude of the camera detected by the attitude sensor 211, but it is also possible to set the functions to be always the same regardless of the output of the attitude sensor 211. Further, it is also possible to set so that the function is not executed even when the first button 121 and the second button 122 are operated.

Further, two buttons, a first button 121 and a second button 122, are provided on the lens apparatus 100. However, two or more buttons may be provided, and functions may be assigned in accordance with the respective attitudes.

Example 1

Figure 3A:
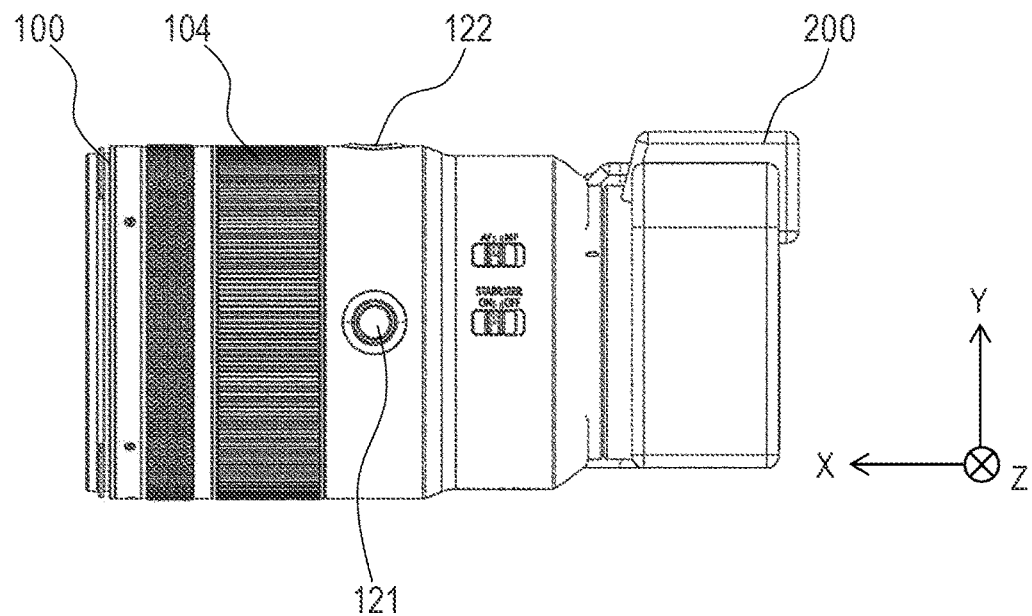
FIG. 3A illustrates the lateral attitude of the camera according to examples 1 and 3-6.
Figure 3B:
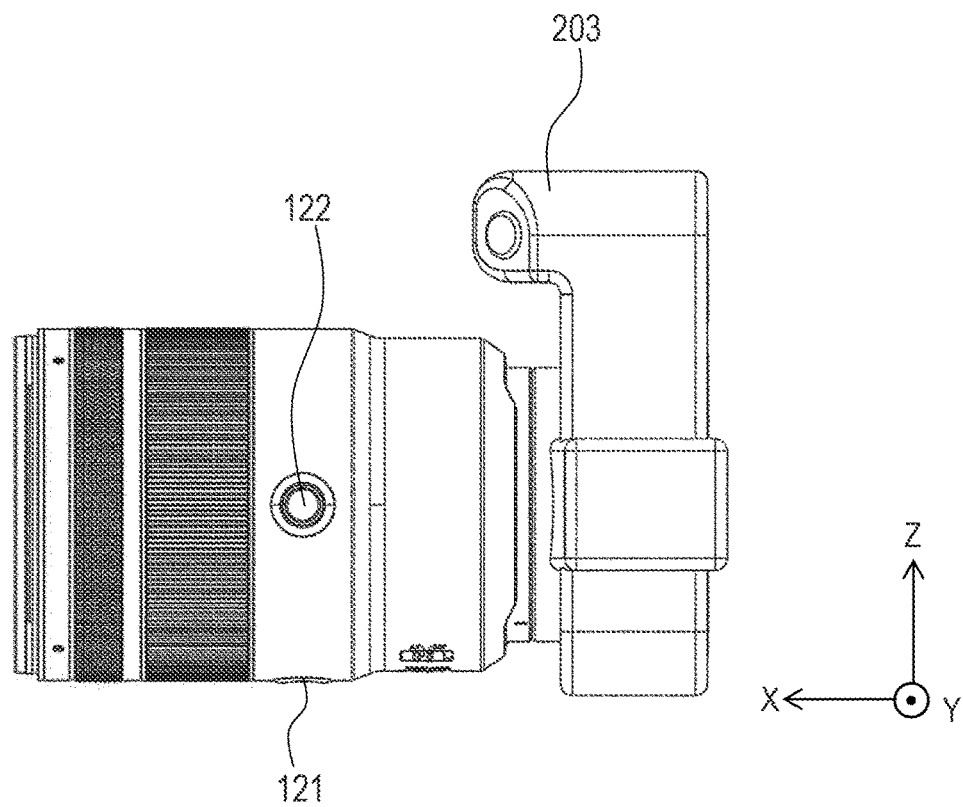
FIG. 3B illustrates the first longitudinal attitude of the camera according to examples 1 and 3-6.
Figure 4A:
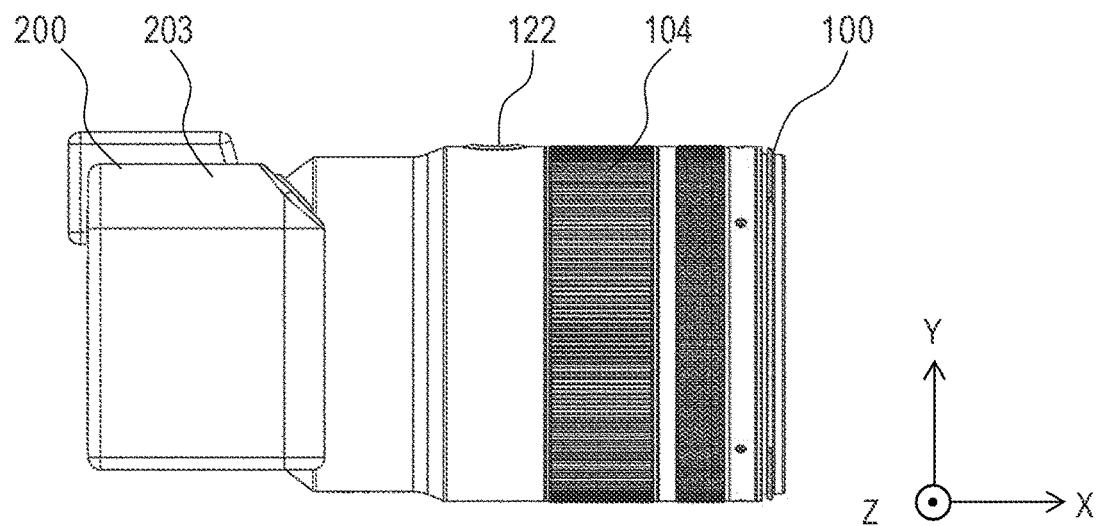
FIG. 4A illustrates the lateral attitude of the camera according to examples 1 and 3-6.
Figure 4B:
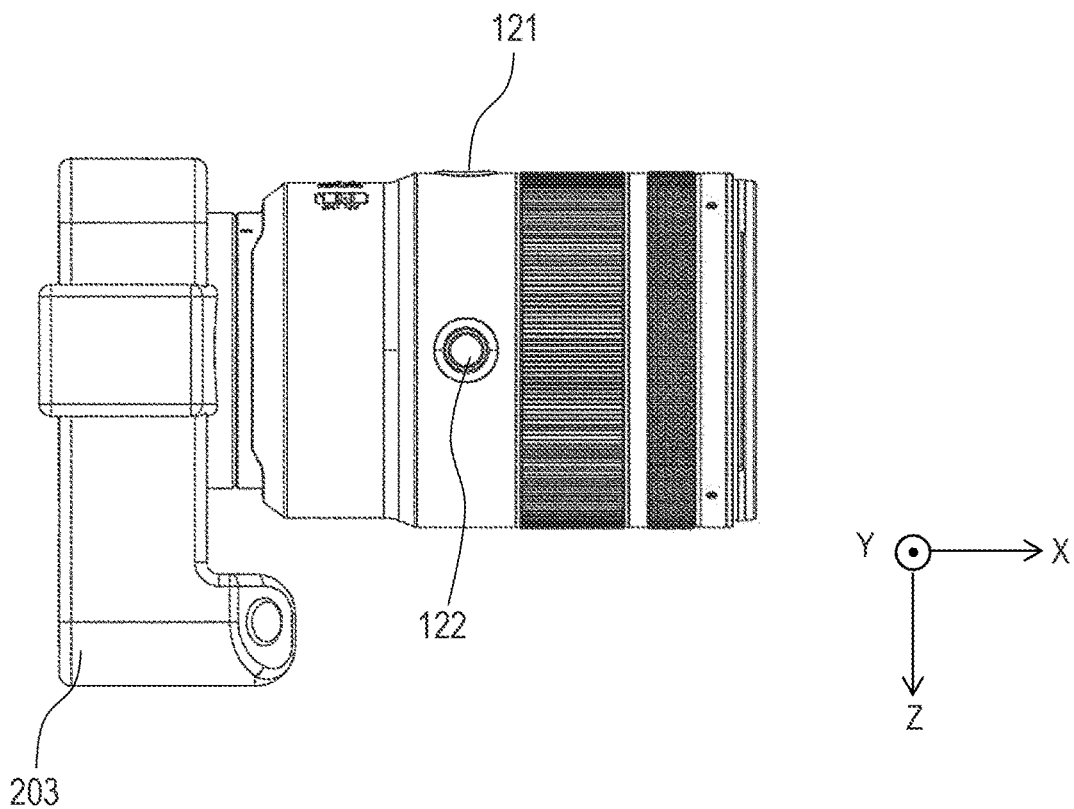
FIG. 4B illustrates the second longitudinal attitude of the camera according to examples 1 and 3-6.

Next, an example 1 in which assigned functions are switched in accordance with the attitude of the image pick up apparatus will be described. FIG. 3A and FIG. 4A illustrate the lateral attitude of the camera as viewed in the horizontal direction when the camera is normally held for photographing. FIG. 3B illustrates a first longitudinal attitude of the camera when the camera is viewed in the horizontal direction in a case where the camera grip 203 is on a vertical upper side in the longitudinal direction at the time of capturing an image by normally holding the camera. FIG. 4B illustrates a second longitudinal attitude of the camera when the camera is viewed in the horizontal direction in a case where the camera grip 203 is on a vertical lower side at the time of capturing an image by normally holding the camera. The configurations of the lens apparatus 100 and the camera body 200 in example 1 are the same as those in the embodiment, and thus the description thereof will be omitted.

(Holding of the Camera in the Lateral Attitude of the Camera A-1)

When the camera is normally held for photographing, it is generally to hold the camera in the lateral attitude illustrated in FIG. 3A so that the camera grip 203 is gripped by the right hand, the left hand is placed on the lower side of the lens apparatus 100, and the entire lens apparatus 100 is supported. At this time, the lens apparatus 100 is supported such that the thumb of the left hand is on the left side (−Z side) and the index finger or the like of the left hand is on the right side (+Z side) when viewed in the optical axis direction from the camera mount 201 side (not illustrated), whereby the camera can be held more stably. It is also possible to hold and operate the focus operation ring 104 with the thumb or index finger of the left hand. Alternatively, it is possible to operate it while being placed the thumb of the left hand on the first button 121. However, it is difficult to operate the second button 122 because it is farther from the fingertips of the left hand than the first button 121. However, the operation is possible by shifting the lens apparatus 100 so that one of the fingers of the left hand can reach the second button 122.

(Holding of the Camera in the First Longitudinal Attitude of the Camera B-1)

When the camera body 200 is changed from the lateral attitude illustrated in FIG. 3A to the first longitudinal attitude illustrated in FIG. 3B, the position of the right hand gripping the camera grip 203 changes from the horizontal position to a vertical upper position. However, the left hand can stably hold the lens apparatus 100 by supporting the lens apparatus 100 from the vertical lower side of the lens apparatus 100, similarly to the lateral attitude. In addition, it is difficult for the thumb of the left hand to reach the first button 121, and it is difficult to operate the first button 121. However, since the thumb of the left hand can easily reach the second button 122, the operation of the second button 122 is facilitated.

(Holding of the Camera in the Second Longitudinal Attitude of the Camera C-1)

When the camera body 200 is changed from the lateral attitude illustrated in FIG. 4A to the second longitudinal attitude illustrated in FIG. 4B, the position of the right hand gripping the camera grip 203 changes from the horizontal position to the vertical lower position. However, the left hand can stably hold the lens apparatus 100 by supporting the lens apparatus 100 from the vertical lower side, similarly to the lateral attitude. In addition, it is difficult for the thumb of the left hand to reach the first button 121, and it is difficult to operate the first button 121. However, since the index finger or the like of the left hand can easily reach the second button 122, the operation of the second button 122 is facilitated.

When the camera is rotated approximately 90 degrees around the optical axis X to change a photographing composition from the lateral attitude illustrated in FIG. 3A and FIG. 4A, the right hand follows the camera body 200 to hold the camera grip 203 of the camera body 200. However, in the first and second longitudinal attitudes, the left hand supports the lens apparatus 100 and the camera body 200 from below, so that the left hand touches a position rotated by approximately 90 degrees relative to the lateral attitude. Therefore, when operating the buttons on the exterior of the lens apparatus 100, a range that the fingers of the left hand can reach is different from that in the lateral attitude, for example, buttons that can be reached in the lateral attitude may not be reachable in the first and second longitudinal attitudes. Alternatively, the part of the palm other than the fingers touching the lens apparatus 100 may easily touch the buttons, and the buttons may be unintentionally operated.

In the first longitudinal attitude illustrated in FIG. 3B, the palm of the left hand or the vicinity of the third joint of the index finger may come into contact with the first button 121 depending on the position of the left hand placed under the lens apparatus 100. Therefore, the first button 121 may be unintentionally pressed at the time of photographing.

In the example 1, a shutter function is assigned to the first button 121 in the lateral attitude. Then, when the attitude is changed from the lateral attitude to the first longitudinal attitude, the function is switched (set) so as to stop the function of the first button 121. On the other hand, the second button 122 may be switched (set) so that another function is processed according to the attitude of the camera. In the example 1, the function of the first button 121 is switched to be stopped (no processing is executed even when the first button is pressed) in the first longitudinal attitude, so that an erroneous operation can be suppressed. Therefore, in each attitude, it is possible to perform photographing by utilizing the functions assigned to the first button 121 and the second button 122 while suppressing processing due to erroneous operation.

Example 2

Figure 5A:
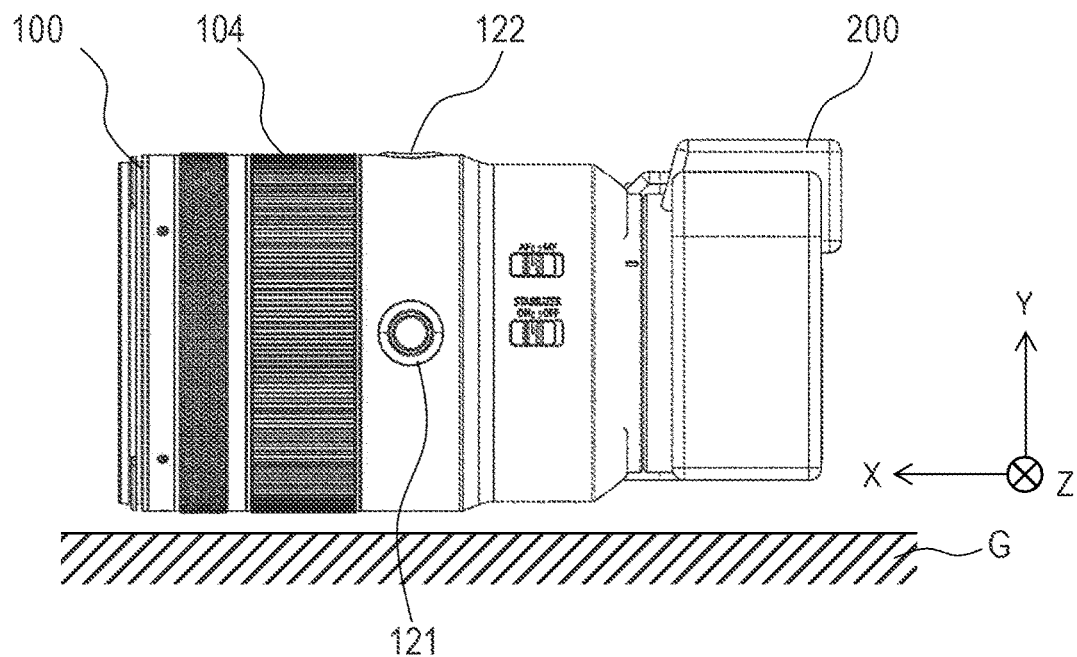
FIG. 5A illustrates lateral attitude of the camera according to an example 2.
Figure 5B:
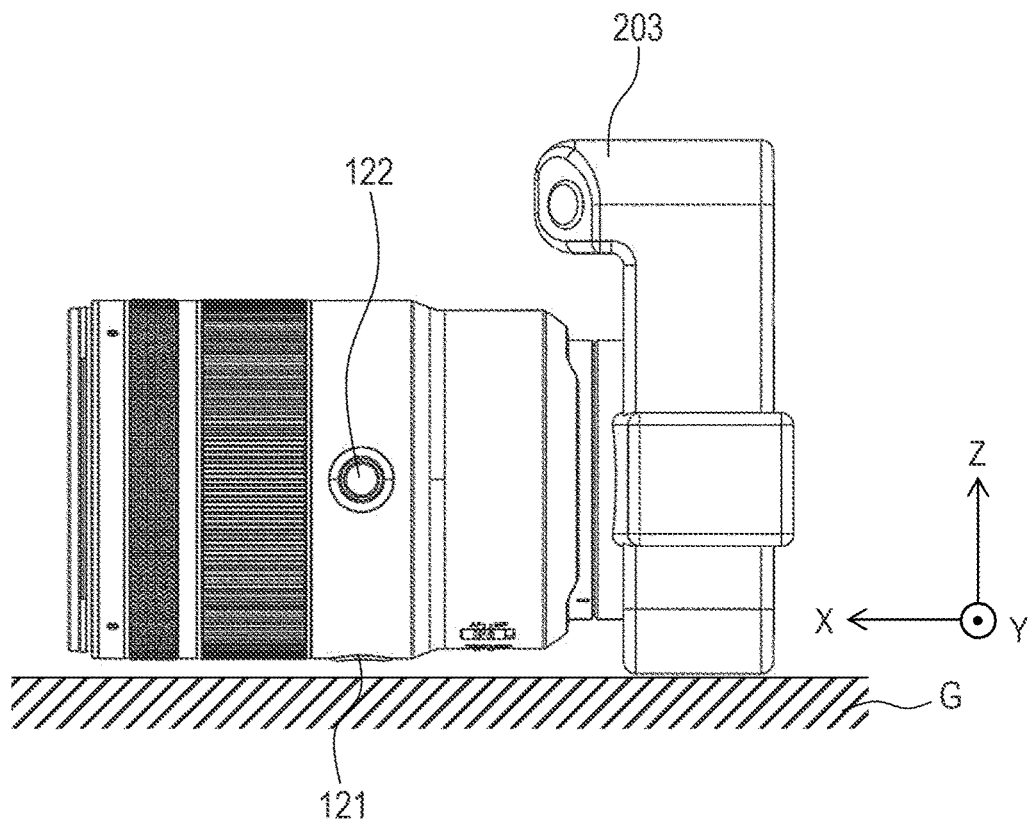
FIG. 5B illustrates the first longitudinal attitude of the camera according to example 2.
Figure 6A:
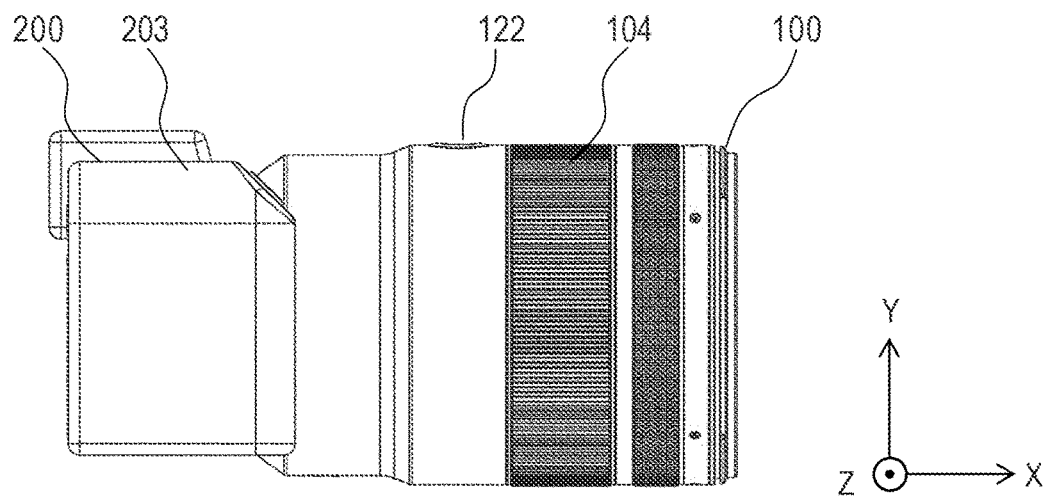
FIG. 6A illustrates the lateral attitude of the camera according to the example 2.
Figure 6B:
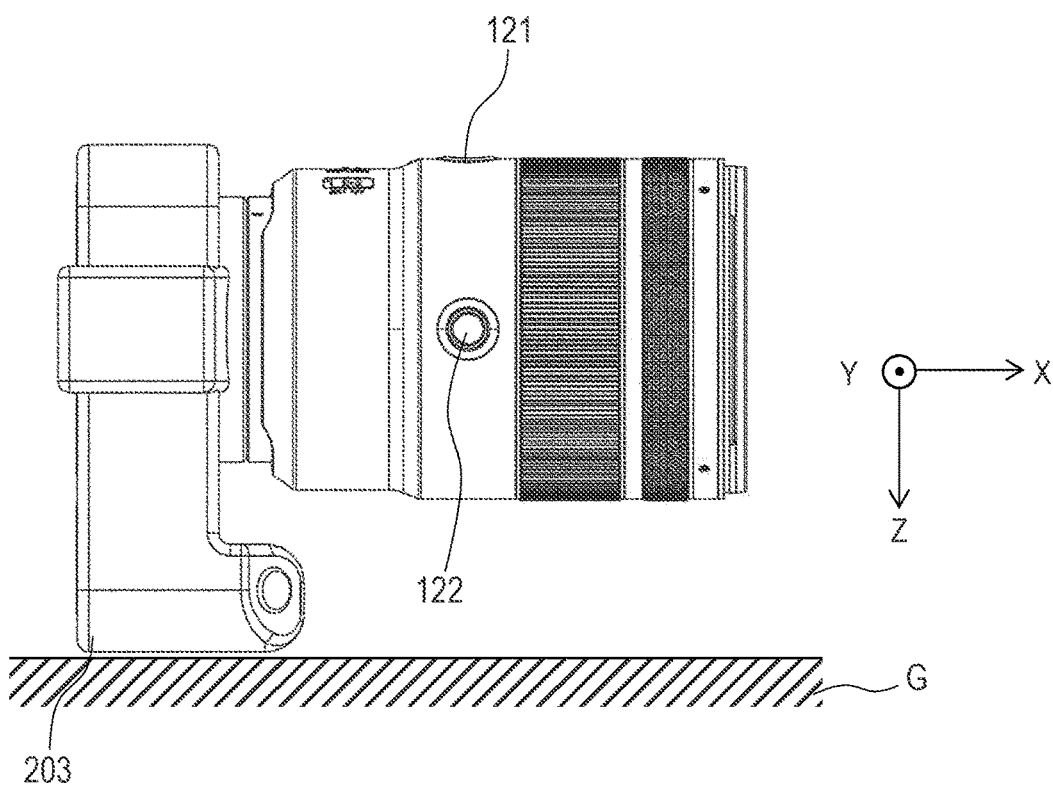
FIG. 6B illustrates the second longitudinal attitude of the camera according to the example 2.

Next, an example 2 in which assigned functions are switched in accordance with the attitude of the image pick up apparatus will be described. FIG. 5A and FIG. 6A illustrate the lateral attitude of the camera viewed in the horizontal direction when the camera is held near the ground G and photographing is performed at the low position. FIG. 5B illustrates a first longitudinal attitude of the camera viewed in the horizontal direction when the camera is held near the ground G and photographing is performed at the low position, and the camera grip 203 is on the vertical upper side. FIG. 6B illustrates a second longitudinal attitude of the camera viewed in the horizontal direction when the camera is held near the ground G and photographing is performed at the low position, and the camera grip 203 is on the vertical lower side. The configurations of the lens apparatus 100 and the camera body 200 in the present example are the same as those in the embodiment, and thus the description thereof will be omitted.

(Holding of the Camera in the Lateral Attitude of the Camera A-2)

When the camera is held near the ground G and photographing is performed at the low position, it is generally to hold the camera in the lateral attitude illustrated in FIG. 5A so that the camera grip 203 is gripped by the right hand, and the lens apparatus 100 is held by the left hand from the left side or the upper side of the lens apparatus 100. At this time, the focus operation ring 104 can be operated while being held by the thumb, index finger, or the like of the left hand. Alternatively, each of the first button 121 and the second button 122 can be operated with the thumb, the index finger, or the like of the left hand.

(Holding of the Camera in the First Longitudinal Attitude of the Camera B-2)

When the camera body 200 is changed from the lateral attitude illustrated in FIG. 5A to the first longitudinal attitude illustrated in FIG. 5B, the position of the right hand gripping the camera grip 203 changes from the horizontal position to the vertical upper position. However, the left hand holds the lens apparatus 100 from the left side or the upper side of the lens apparatus 100, similarly to the lateral attitude. Since the first button 121 is located on the ground G side, it is difficult or impossible to operate the first button 121 when the distance between the ground G and the lens apparatus 100 is very small. However, since the thumb of the left hand can easily reach the second button 122, the operation of the second button 122 is facilitated.

(Holding of the Camera in the Second Longitudinal Attitude of the Camera C-2)

Next, when the camera body 200 is changed from the lateral attitude illustrated in FIG. 6A to the second longitudinal attitude illustrated in FIG. 6B, the position of the right hand gripping the camera grip 203 changes from the horizontal position to the vertical lower position. When the distance between the ground G and the lens apparatus 100 is large to some extent, the left hand can stably hold the lens apparatus 100 by supporting the lens apparatus 100 from the vertical lower side, similarly to the lateral attitude. In this case, it is difficult for the thumb of the left hand to reach the first button 121, and it is difficult to operate the first button 121. However, the index finger or the like of the left hand can easily reach the second button 122, and the operation of the second button 122 is facilitated.

In the first longitudinal attitude illustrated in FIG. 5B, the first button 121 cannot be operated with the left hand from the lower side of the lens apparatus 100. The same applies to a case where a tripod seat is attached to the lower side of the lens apparatus 100.

In example 2, it is in the lateral attitude, the shutter function is assigned to the first button 121, and a function other than the shutter function is assigned to the second button 122. When the lateral attitude is changed to the first longitudinal attitude, the first button 121 cannot be pressed, and thus the function of the first button 121 is switched to a function other than the shutter function, while the function of the second button 122 is switched to the shutter function. When the camera is changed from the lateral attitude to the second longitudinal attitude, the first button 121 can be easily pressed, and thus the function of the first button 121 is switched to a function other than the shutter function. In the example 2, the shutter can be reliably operated even when the camera is held near the ground G to photograph at a low position or when a tripod is attached to the lower side of the lens apparatus 100.

Example 3

Next, an example 3 in which assigned functions are switched in accordance with the attitude of the image pick up apparatus will be described. The example 3 will be described with reference to FIGS. 3A, 3B, 4A, and 4B of the example 1. Further, in example 3, the configurations of the lens apparatus 100 and the camera body 200 are the same as those in the embodiment, and thus the description thereof will be omitted.

(Holding of the Camera in the Lateral Attitude of the Camera A-3)

When the camera is held above the head of the photographer and photographing is performed at a high position, it is generally to hold the camera in the lateral attitude illustrated in FIG. 3A so that the camera grip 203 is gripped by the right hand, and the lens apparatus 100 is held by the left hand from the left side or the lower side of the lens apparatus 100. At this time, the focus operation ring 104 can be operated while being held by the thumb, index finger, or the like of the left hand. Alternatively, each of the first button 121 and the second button 122 can be operated with the thumb, the index finger, or the like of the left hand.

(Holding of the Camera in the First Longitudinal Attitude of the Camera B-3)

When the camera body 200 is changed from the lateral attitude illustrated in FIG. 3A to the first longitudinal attitude illustrated in FIG. 3B, the position of the right hand gripping the camera grip 203 changes from the horizontal position to the vertical upper position. However, the left hand holds the lens apparatus 100 from the left side or the lower side of the lens apparatus 100, similarly to the lateral attitude. In addition, it is difficult for the thumb of the left hand to reach the first button 121, and it is difficult to operate the first button 121. However, since the thumb of the left hand can easily reach the second button 122, the operation of the second button 122 is facilitated.

(Holding of the Camera in the Second Longitudinal Attitude of the Camera C-3)

Next, when the camera body 200 is changed from the lateral attitude illustrated in FIG. 4A to the second longitudinal attitude illustrated in FIG. 4B, the position of the right hand gripping the camera grip 203 changes from the horizontal position to the vertical lower position. However, the left hand can stably hold the lens apparatus 100 by supporting the lens apparatus 100 from the vertical lower side, similarly to the lateral attitude. In addition, it is difficult for the thumb of the left hand to reach the first button 121, and it is difficult to operate the first button 121. However, the index finger or the like of the left hand can easily reach the second button 122, and the operation of the second button 122 is facilitated.

When the lens apparatus 100 is held by the left hand from the left side or the lower side of the lens apparatus 100 in the first longitudinal attitude illustrated in FIG. 3B, it is difficult for the thumb of the left hand to reach the first button 121 of the lens apparatus 100, and it is difficult to operate the first button 121. On the other hand, when the left hand is reversed by 180 degrees and the lens apparatus 100 is held from the left side of the lens apparatus 100, the thumb of the left hand can easily reach the first button 121 of the lens apparatus 100, and the first button 121 can be operated. In the second longitudinal attitude illustrated in FIG. 4B, it is difficult for the thumb of the left hand to reach the first button 121 of the lens apparatus 100, and it is difficult to operate the first button 121.

In the example 3, for example, a shutter function is assigned to the first button 121 in the lateral attitude. Then, even when the attitude is changed from the lateral attitude to the first longitudinal attitude, the first button 121 is easier to press than the second button 122, and thus the function is not changed. On the other hand, when the lateral attitude is changed to the second longitudinal attitude, the first button 121 moves upward and is difficult to press, and thus the function of the first button 121 is switched to a function other than the shutter function. On the other hand, the function of the second button 122 is switched to the shutter function. In the example 3, it is possible to reliably operate the shutter even in a case where photographing is performed at a high position while the camera is held high above the head of the photographer.

Example 4

Next, an example 4 in which assigned functions are switched in accordance with the attitude of the image pick up apparatus will be described. The example 4 will be described with reference to FIGS. 3A, 3B, 4A, and 4B of the example 1. Further, in example 4, the configurations of the lens apparatus 100 and the camera body 200 are the same as those in the embodiment, and thus the description thereof will be omitted.

(Holding of the Camera in the Lateral Attitude of the Camera A-4)

When a photographing direction of the camera is directed toward the photographer and a oneself photographing is performed, it is generally to hold the camera in the lateral attitude illustrated in FIG. 3A so that the camera grip 203 is gripped by the left hand, and the lens apparatus 100 is held by the right hand from the side or lower side of the lens apparatus 100. At this time, the focus operation ring 104 can be operated while being held by the thumb, index finger, or the like of the right hand. Alternatively, each of the first button 121 and the second button 122 can be operated with the thumb, index finger, or the like of the right hand.

(Holding of the Camera in the First Longitudinal Attitude of the Camera B-4)

When the camera body 200 is changed from the lateral attitude illustrated in FIG. 3A to the first longitudinal attitude illustrated in FIG. 3B, the position of the left hand gripping the camera grip 203 changes from the horizontal position to the vertical upper position. However, the right hand can stably hold the lens apparatus 100 by supporting the lens apparatus 100 from the vertical lower side of the lens apparatus 100, similarly to the lateral attitude. In addition, it is difficult for the thumb of the right hand to reach the first button 121, and it is difficult to operate the first button 121. However, since the thumb of the right hand can easily reach the second button 122, the operation of the second button 122 is facilitated.

(Holding of the Camera in the Second Longitudinal Attitude of the Camera C-4)

Next, when the camera body 200 is changed from the lateral attitude illustrated in FIG. 4A to the second longitudinal attitude illustrated in FIG. 4B, the position of the left hand gripping the camera grip 203 changes from the horizontal position to the vertical lower position. However, the right hand can stably hold the lens apparatus 100 by supporting the lens apparatus 100 from the vertical lower side, similarly to the lateral attitude. In addition, it is difficult for the thumb of the right hand to reach the first button 121, and it is difficult to operate the first button 121. However, since the thumb of the right hand can easily reach the second button 122, the operation of the second button 122 is facilitated.

To each of the first button 121 and the second button 122, a predetermined function is set in advance by the photographer, and an arbitrary function is assigned in accordance with the attitude of the camera. The assigned function is switched in accordance with the attitude of the camera detected by the attitude sensor 211 provided in the camera body 200. For example, when the attitude is changed from the lateral attitude to the first longitudinal attitude, the function of the first button 121 is assigned to the second button 122. Similarly, when the attitude changed to the second longitudinal attitude, the function of the first button 121 is assigned to the second button 122. Accordingly, it is possible to perform photographing while utilizing the functions assigned to the first button 121 and the second button 122 in each attitude of the camera.

Example 5

Examples of different camera holding modes have been described in the example 1-4. In each variation according to an example 5, an example for each function to be switched will be described. FIG. 3A, FIG. 3B, FIG. 4A, and FIG. 4B are used to describe each variation of the present example. The configurations of the lens apparatus 100 and the camera body 200 in each variation of the present example are the same as those in the embodiment, and thus the description thereof will be omitted. The camera is held in the same manner as in the example 1, and a description thereof will be omitted.

Example 5-1

In the first longitudinal attitude illustrated in FIG. 3B, since the position of the right hand gripping the camera grip 203 is the vertical upper position, the side of the right hand of the photographer may be opened and the attitude of the camera may become unstable when the photographer performs photographing while normally holding the camera. Therefore, image blur may easily occur at the time of photographing.

In the example 5-1, the function of the first button 121 is switched in order to perform the image blur countermeasure. In the lateral attitude, for example, a shutter function is assigned to the first button 121. Then, when the lateral attitude is changed to the first longitudinal attitude, the function of the first button 121 is switched to the function of the powered IS for strongly correcting the image blur. As described in the example 1, the first button 121 may be unintentionally pressed in the first longitudinal attitude. On the other hand, in example 5-1, the state in which the first button 121 is pressed is maintained by using the self-weight of the lens apparatus 100, the photographer can easily utilize the function of the powered IS in the first longitudinal attitude, and can perform photographing while utilizing the assigned function.

Example 5-2

In example 5-2, the function of the first button 121 is switched in order to realize various image expressions. In the lateral attitude, for example, a shutter function is assigned to the first button 121. Then, when the lateral attitude is changed to the first longitudinal attitude or the second longitudinal attitude, the function of the first button 121 is switched to the function of changing the direction detection of an IS panning shot mode. In addition, a function of changing the direction detection of the IS panning shot mode may be activated by pressing the first button 121. In example 5-2, by switching the function of the first button 121, it is possible to realize various image expressions, and it is possible to perform photographing while utilizing the assigned function.

Example 5-3

In the example 5-3, the function of the first button 121 is switched in order to realize the selective use according to photographing scenes. An AF stop function is assigned to the first button 121 in the lateral attitude, and the function of the first button 121 is switched to the function of switching the pupil AF between the left and right when the lateral attitude is changed to the first longitudinal attitude or the second longitudinal attitude. In example 5-3, the function of the first button 121 is switched from the AF stop function for photographing a sports scene to the right/left switching function of the pupil AF for photographing a portrait, so that it is possible to realize the proper use according to the photographing scene. Then, photographing can be performed while utilizing the assigned function.

Example 5-4

In the example 5-4, the function of the first button 121 is switched in order to realize the use in accordance with further different photographing scenes. In the lateral attitude, for example, a shutter function is assigned to the first button 121. Then, when the attitude of the camera is changed to the first longitudinal attitude, the function of the first button 121 is switched to the function of setting a focus limit to the near side. Further, when the attitude of the camera is changed to the second longitudinal attitude, the function of the first button 121 is switched to a function of setting the focus limit close to infinity. In the example 5-4, by switching the function of the first button 121 to the setting function of the focus limit, it is possible to realize the selective use in accordance with the photographing scene, and it is possible to perform the photographing while utilizing the assigned function.

Example 5-5

In example 5-5, the function of the first button 121 is switched in order to realize further selective use according to different photographing scenes. In the lateral attitude, for example, a shutter function is assigned to the first button 121. Then, when the attitude of the camera is changed to the first longitudinal attitude, the function of the first button 121 is switched to the function of the powered IS. Further, when the attitude of the camera is changed to the second longitudinal attitude, the function of the first button 121 is switched to the function of a macro IS. In example 5-5, by switching the function of the first button 121 to the setting function of the IS mode, it is possible to realize the selective use in accordance with the photographing scene, and it is possible to perform the photographing while utilizing the assigned function.

Example 5-6

In the example 5-6, the function of the first button 121 is switched in order to realize the use in accordance with further different photographing scenes. In the lateral attitude, an AF switching function activated by pressing the first button 121 once and the AF stop function activated by continuously pressing the first button 121 are assigned to the first button 121. Then, when the attitude of the camera is changed to the first longitudinal attitude, the function of the first button 121 is switched to the AF switching function activated by pressing the first button 121 once, and to the focus limit function by continuously pressing the first button 121. In the example 5-6, by switching the function of the first button 121 to the setting function relating to the AF, it is possible to realize the selective use in accordance with the photographing scene, and it is possible to perform the photographing while utilizing the assigned function.

Example 6

In each of the variations according to the example 5, the example of the functions to be switched has been described. In each variation according to the example 6, an example of each function for controlling an image displayed on the monitor 205 will be described. FIG. 3A, FIG. 3B, FIG. 4A, and FIG. 4B are used to describe each variation of the present example. In this example, the configurations of the lens apparatus 100 and the camera body 200 are the same as those in the embodiment, and thus the description thereof will be omitted. The camera is held in the same manner as in the example 1, and a description thereof will be omitted.

Example 6-1

In example 6-1, in the lateral attitude, the first button is assigned with a function of causing the monitor 205 to perform a depth-of-field preview of the electromagnetic diaphragm unit 116 (EMD, Electro Magnetic Diaphragm). Then, when the attitude is changed to the first longitudinal attitude illustrated in FIG. 3B, the function of performing the depth-of-field preview of the first button is switched to the second button. It is possible to perform the operation without moving the position of the hand from the hold state at the time of photographing while looking into the finder (or looking at the liquid crystal monitor). The position of the left hand does not change between the lateral attitude and the longitudinal attitude, and the left hand can be put under the lens apparatus 100 to stably support the lens apparatus 100.

Example 6-2

In example 6-2, in the lateral attitude, a function of enlarging or returning an image on the monitor 205 is assigned to the first button. Then, when the attitude is changed to the first longitudinal attitude illustrated in FIG. 3B, the function of enlarging or returning the image of the first button is switched to the second button. It is possible to perform the operation without moving the position of the hand from the hold state at the time of photographing while looking into the finder (or looking at the liquid crystal monitor). The position of the left hand does not change between the lateral attitude and the longitudinal attitude, and the left hand can be put under the lens apparatus 100 to stably support the lens apparatus 100.

Example 6-3

In example 6-3, in the lateral attitude, the first button is assigned a function of performing backward (or forward) at the time of image reproduction on the monitor 205. Then, in the first longitudinal attitude illustrated in FIG. 3B, the return function of the first button during image reproduction is switched to the second button. It is possible to perform the operation without moving the position of the hand from the hold state at the time of photographing while looking into the finder (or looking at the liquid crystal monitor). The position of the left hand does not change between the lateral attitude and the longitudinal attitude, and the left hand can be put under the lens apparatus 100 to stably support the lens apparatus 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091385, filed Jun. 6, 2022, which is hereby incorporated by reference herein in its entirety.

What is claimed is:

1. An image pick up apparatus comprising:
   a lens apparatus, the lens apparatus comprising:
   lenses,
   a fixed barrel,
   a rotatable ring configured to rotate about an optical axis,
   a plurality of buttons arranged on an exterior portion of the fixed barrel, and
   a mount configured to hold the lens apparatus,
   an image pickup portion configured to capture an image formed by the lens apparatus; and
   an attitude sensor,
   wherein
   each of the plurality of buttons arranged on the exterior portion of the fixed barrel of the lens apparatus is respectively assigned a function to be executed by operating each button; and
   the assigned function is switched in accordance with an attitude of the image pick up apparatus detected by the attitude sensor.

2. The image pick up apparatus according to claim 1, wherein the attitude sensor is provided in at least one of the image pickup portion and the lens apparatus, and detects a first attitude of the image pick up apparatus and a second attitude in which the image pick up apparatus is positioned at a different angle around an optical axis of the lens apparatus from the first attitude.

3. The image pick up apparatus according to claim 1, wherein the function is assigned to each of the plurality of buttons by a photographer through an operation portion of at least one of the image pickup portion and the lens apparatus.

4. The image pick up apparatus according to claim 1, wherein the function can be assigned by selecting an arbitrary function from a plurality of functions.

5. The image pick up apparatus according to claim 1, wherein the function of the button can be set to be always the same regardless of the output of the attitude sensor.

6. The image pick up apparatus according to claim 1, wherein the button can be set not to be executed even when the button is operated.

7. The image pick up apparatus according to claim 1, wherein a priority of the function is configurable, and the functions assigned to the plurality of buttons can be set to be switched based on the priority and the output of the attitude sensor.

8. The image pick up apparatus according to claim 1, wherein the lens apparatus is detachably mounted to the image pickup portion.

9. A lens apparatus comprising:
   an optical system including lenses;
   a fixed barrel,
   a rotatable ring configured to rotate about an optical axis, and
   a plurality of buttons, arranged on an exterior portion of the fixed barrel, to which functions to be executed by operations are assigned,
   wherein the assigned function is switched in accordance with an attitude of an image pick up apparatus, the attitude being acquired from the image pick up apparatus including an image pick up element configured to capture an image formed by the optical system and an attitude sensor configured to detect the attitude.

10. A lens apparatus comprising:
    an optical system including lenses;
    a fixed barrel,
    a rotatable ring configured to rotate about an optical axis, and
    a plurality of buttons, arranged on an exterior portion of the fixed barrel, to which functions to be executed by operations are assigned; and an attitude sensor configured to detect an attitude of the lens apparatus,
wherein the assigned function is switched in accordance with the attitude of the lens apparatus detected by the attitude sensor.

* * * * *